(12) United States Patent
Suzuki et al.

(10) Patent No.: US 7,975,565 B2
(45) Date of Patent: Jul. 12, 2011

(54) DISK REVERSING/TRANSPORTING MECHANISM AND DISK TESTER USING THE SAME MECHANISM

(75) Inventors: Ryuta Suzuki, Ashigarakami-Gun (JP); Yoshinori Tokumura, Ashigarakami-Gun (JP)

(73) Assignee: Hitachi High-Technologies Corporation, Tokyo (JP)

( * ) Notice: Subject to any disclaimer, the term of this patent is extended or adjusted under 35 U.S.C. 154(b) by 573 days.

(21) Appl. No.: 12/127,437

(22) Filed: May 27, 2008

(65) Prior Publication Data

US 2008/0297944 A1    Dec. 4, 2008

(30) Foreign Application Priority Data

May 28, 2007  (JP) ................................. 2007-140000

(51) Int. Cl.
*G01N 19/00*     (2006.01)
(52) U.S. Cl. ..................................................... 73/865.9
(58) Field of Classification Search ................. 73/865.9, 73/865.8
See application file for complete search history.

(56) References Cited

FOREIGN PATENT DOCUMENTS

| JP | 10-143861 | | 5/1998 |
|---|---|---|---|
| JP | 2000-315320 | | 11/2000 |
| JP | 2006-260675 | | 9/2006 |
| JP | 2006260675 A | * | 9/2006 |

* cited by examiner

*Primary Examiner* — Hezron Williams
*Assistant Examiner* — Tamiko D Bellamy
(74) *Attorney, Agent, or Firm* — Mattingly & Malur, P.C.

(57) ABSTRACT

A disk reversing/transporting mechanism for reversing a disk in transit of the disk from a first position to a second position has a rail, a movable table movable on the rail, and a cam plate having a cam surface provided along the rail and engaged with a roller or a pin and a groove provided on the cam surface and receiving the roller or the pin. A chucking mechanism is provided on the movable table. A crank is provided on the moving table and has a crank shaft and the roller or the pin as a crank pin and is connected to the chucking mechanism. The crank shaft is rotated by a dropping of the roller or the pin in the groove and a slipping out from the groove corresponding to a movement of said movable table to rotate the chucking mechanism to thereby reverse the disk.

8 Claims, 3 Drawing Sheets

DISK REVERSING/TRANSPORTING MECHANISM AND DISK TESTER USING THE SAME MECHANISM

TECHNICAL FIELD

This invention relates to a disk reversing/transporting mechanism and a disk tester using the same mechanism and, in particular, this invention relates to a disk reversing/transporting mechanism which does not require a timing control in reversing a disk, can improve a test efficiency of surfaces of a compact magnetic disk and downsize a tester.

BACKGROUND ART

A surface defect and a performance of a magnetic disk used as an information recording medium have been tested for by a disk tester. The disk tester functions to derive a disk from a non-tested disk cassette storing non-tested disks to be tested, mount the disk on a spindle of the tester, rotate it, test one surface of the disk, reverse the disk by a disk reversing mechanism, test the other surface of the disk and store the tested disk in a tested disk cassette.

In order to efficiently perform disk transportation between spindles and cassettes for non-tested disks and tested disks and a disk reversing, the disk tester of this kind includes various disk transporting devices each using a handling robot. In JP-A-10-143861, one of such disk testers is described. The described disk tester includes a turntable on which a plurality of spindles are arranged, a test stage and a disk reversing mechanism which are arranged around the turntable, where surfaces of a disk can be tested continuously by rotating the turntable by a predetermined angle to reverse the disk.

Further, a disk reversing mechanism for chucking an outer periphery of a disk mounted on a spindle by a chucking mechanism, moving the chucked disk upward from a head of the spindle and rotating the chucked portion by 180° exactly by using an ellipsoidal cam to reverse the disk and then lower the disk to re-mount it on the spindle is described in JP-A-2000-315320.

Incidentally, a hard disk drive (HDD) of 2.5 inches, 1.8 inches and not more than 1.0 inch has been used in various commercial equipment such as automobile products, home electric appliances and audio devices and hard disk drives per se.

The size of the hard disk drive tends to be reduced and the unit cost thereof is lowered. Therefore, manufacturers of hard disk drives are requested to manufacture a large amount of hard disk drives at low cost. In order to accept such a request, it is necessary to provide a compact disk tester which can efficiently test a large amount of hard disk drives.

In order to improve the test efficiency of a disk and downsize the tester, the applicant of this application has filed an invention of a disk test system U.S. patent application Ser. No. 11/513,373 (corresponding to JP-A-2006-260675) in which spindles each for testing one of the surfaces of a disk are provided and the disk is tested by switching the spindles.

In the invention of U.S. application Ser. No. 11/513,373, a disk whose one surface is tested on a first spindle is transported from the first spindle to a second spindle for testing the other surface of the disk while reversing the disk by a disk reversing mechanism during this transportation.

In this case, there is a merit of reversing of the disk during transportation. However, when a disk reversing mechanism described in JP-A-10-143861 or JP-A-2000-315320 is provided, a drive mechanism for reversing the disk, a reversing drive circuit and a transporting device are necessary in addition to a disk chucking mechanism.

Further, in order to downsize the tester, a disk reversing mechanism may be provided on a moving mechanism. However, in such a case, the size of the moving mechanism becomes large and an electrical connection to the disk reversing mechanism and a control of the moving mechanism as well as a timing control in reversing the disk become necessary.

SUMMARY OF THE INVENTION

An object of this invention is to provide a disk reversing/transporting mechanism in which a timing control in reversing a disk is unnecessary, efficiency of testing of opposite surfaces of a disk can be improved and a downsizing of a disk tester is possible.

Another object of this invention is to provide a disk tester which can perform a test of opposite surfaces of a disk and can be downsized.

In order to achieve these objects, the disk reversing/transporting mechanism for reversing a disk during a transportation of the disk from a first position to a second position or a disk tester of this application comprises a rail provided between the first position to the second position, a movable table movable along the rail, a cam plate having a cam surface provided along the rail and engaged with a roller or a pin and a groove provided on the cam surface and receiving the roller or the pin, a chucking mechanism provided on the movable table, for chucking the disk, and a crank which is provided on said movable table, has a crank shaft and the roller or the pin as a crank pin and is connected to the chucking mechanism, for rotating the chucking mechanism correspondingly to the rotation of the crank shaft, wherein the crank shaft is rotated by a slipping of the roller or the pin in the groove and a slipping out of the roller from the groove during a movement of the movable table to rotate the chucking mechanism to thereby reverse the disk.

In the disk reversing/transporting mechanism or the disk tester of this invention, the roller or the pin (referred to as "roller", hereinafter) and the grooved cam plate for moving the roller vertically are provided and the roller is moved vertically correspondingly to a movement of a movable table by slipping the roller in the groove of the cam plate and slipping out the roller from the groove. The disk is reversed by the rotation of the chucking mechanism corresponding to a half rotation of the crank shaft.

The disk reversing/transporting mechanism of this invention includes only the crank and the chucking mechanism provided on the movable table of the moving mechanism and the cam plate provided along the rail. Since there is no need of providing a drive mechanism for reversing of the disk, it is possible to downsize the moving mechanism. Further, there is need of neither a drive mechanism for reversing the disk electrically nor a reversing timing control.

As a result, a compact disk can be tested efficiently and a compact disk reversing/transporting mechanism and a compact disk tester utilizing the disk reversing/transporting mechanism can be easily realized.

DESCRIPTION OF THE PREFERRED EMBODIMENTS

Figure 3:
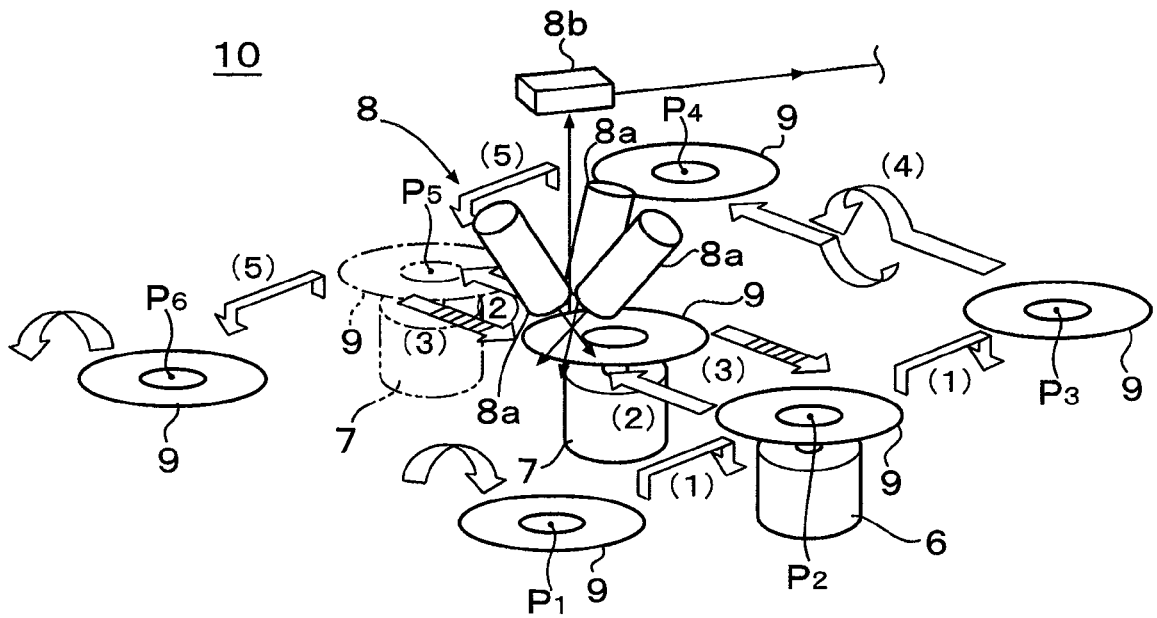
FIG. 3 illustrates a total operation of a disk tester of this invention.

In FIG. 3, a reference numeral 10 depicts a disk transporting mechanism. An optical surface test system 8 is provided in a center portion of the disk transporting mechanism 10 around which a handling path is arranged.

A spindle 6 for testing one of the surfaces of a disk is arranged in a position P2 and a spindle 7 for testing the other surface of the disk is arranged in a position P5.

Incidentally, FIG. 3 shows a state when the spindle 7 arranged in the position P5 for testing the other surface of the disk is moved below the optical surface test system 8. In this state, a disk 9 mounted on the spindle 7 is set in a disk testing position.

The spindle 6 in the position P2 and the spindle 7 in the position P5 are alternately positioned below the optical system 8 and disks 9 mounted on the spindles 6 and 7 are rotated in these positions, respectively. The defect detection of the disk 9 is performed optically by the optical surface test system 8 while rotating the disk. In order to position the disk 9 in a disk testing position by alternately moving the disk 9 below the optical surface test system 8, a rail (not shown) is provided between the position P2 and the position P5 and the spindles 6 and 7 are alternately moved along the rail between the optical surface test system 8.

Incidentally, such a mechanism for moving the spindles 6 and 7 along the rail has a structure similar to a rail 3 and a linear moving mechanism 2 which will be described later.

The optical surface test system 8 includes a laser light optical system 8a and a light receiving element (avalanche photodiode (APD)) 8b. An electric signal related to the detected defect correspondingly to scattered light received by the light receiving element 8b is sent to a control device (not shown) and the detect test of the disk 9 is performed.

Incidentally, a light receiving system to be provided in front of the light receiving element 8b is not shown in FIG. 3.

In FIG. 3, a position P1 is a disk loading position in which a loader handling robot (not shown) of the disk transporting mechanism 10 receives the disk 9 from a cassette by a disk handling robot (not shown).

Figure 1:
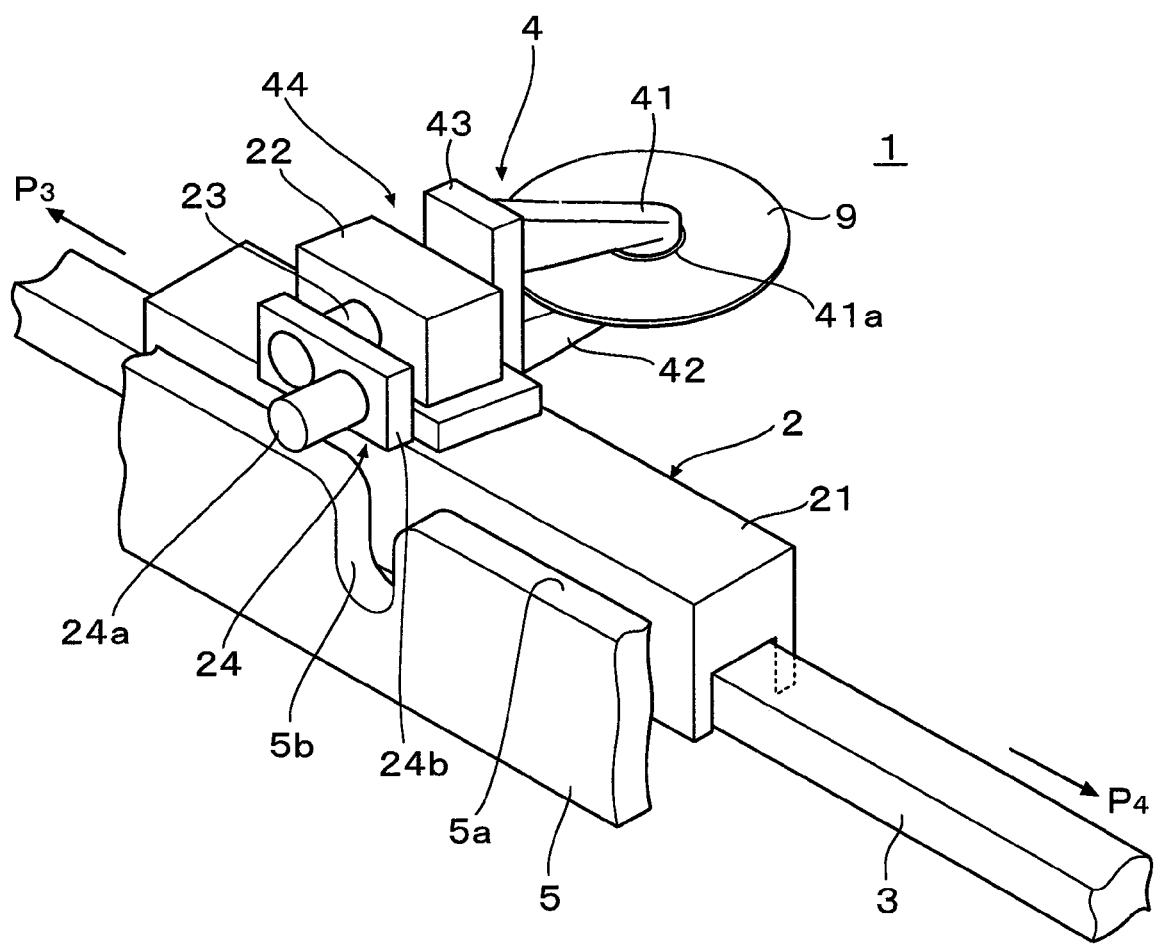
FIG. 1 is a perspective view of an embodiment of a disk reversing/transporting mechanism of this invention.

In a position P3, the loader handling robot receives the tested disk 9 from the surface test spindle 6 positioned in the position P2 and transfers the disk to the disk receiving/transporting mechanism 1 (refer to FIG. 1). The loader handling robot transfers the disk 9, which is not tested and loaded in the position P1, to the position P2 and mounts it on the spindle 6 arranged in the position P2.

In a position P4, the disk 9 received by the disk reversing/transporting mechanism 1 (refer to FIG. 1) is transferred to an unloader handling robot (not shown) of the disk transporting mechanism 10. The unloader handling robot moves the received disk 9 from the position P4 to a position P5 and mounts it on the spindle 7 positioned in the position P5.

A position P6 is a disk unloading position. In this position, the unloader handling robot receives the disk 9 having the other surface tested and arranged in the position P5 from the spindle 7 and transfers it to a disk handling robot (not shown) for storing the disk in a cassette.

The handling robot for performing the disk handling process and a disk tester having such a handling robot are described in detail in U.S. patent application Ser. No. 11/513, 373 which is incorporated herein by reference. Since the present invention is not the handling process of the disk, it is not shown in the figures.

Though not shown, hands of the loader handling robot and the unloader handling robot are chucking mechanisms for chucking disks by outer peripheries thereof and are movable forward and backward between the disk loading position and the disk unloading position with respect to the cassettes.

The disk handling operation of the disk transporting mechanism 10 will be described briefly with reference to FIG. 3. First, the loader handling robot receives a new disk 9 in the forward position (a movement in a step (5) in FIG. 3) from the disk handling robot in the position P1 (disk supply position). The disk 9 in the disk supply position is mounted on the spindle 6 in the position P2 by a backward movement of the loader handling robot (a movement in a step (1) in FIG. 3).

In this case, the tested disk 9 mounted on the spindle 6 is demounted from the spindle 6 at the same time of the backward movement or at any preceding timing and is moved to the position P3 by a backward movement (the movement in the step (1)) of the loader handling robot. Therefore, the tested disk 9 is transferred to the reversing/transporting mechanism 1 in the position P3 in which the disk reversing/transporting mechanism 1 shown in FIG. 1 stands by.

The disk 9 mounted on the spindle 6 in the position P2 is set in a test position when the spindle 6 is moved below the optical system 8 by a spindle switching drive (the movement in the step (2)). In this case, the spindle 7 is returned from the beneath of the optical system 8 to the position P5 which is the initial position (the movement in the step (2)). Incidentally, the spindle switching operation in this case is performed after the test of the disk 9 mounted on the spindle 7 is completed.

When the surface test of the disk 9 mounted on the spindle 6 is ended, the spindle switching operation (a movement in the step (3)) is performed, so that the spindle 6 is returned from the test position below the optical system 8 to the initial position P2. In this case, the disk 9 mounted on the spindle 7 for testing the other surface of a disk is set in the test position by the movement of the spindle 7 beneath the optical system 8 (the movement in the step (3)).

On the other hand, the disk 9, which is received by the disk reversing/transporting mechanism 1 (refer to FIG. 1) in the position P3, is reversed during the testing by movement of the disk reversing/transporting mechanism 1 (a movement in the step (4)) and transported from the position P3 to the disk transporting position P4 in which the other surface is tested.

The disk testing time is longer than a disk reversing/transporting time of the disk reversing/transporting mechanism 1. Further, since there is time for testing two disks, the disk 9 which is reversed by the disk reversing/transporting mechanism 1 before the surface test of the disk 9 mounted on the spindle is ended reaches the position P4 on the side of the spindle 7 and is transferred to the spindle 7. Further, during the testing of the disk 9 mounted on the spindle 6, the disk reversing/transporting mechanism 1 can be returned to the original position P3. In other words, the disk reversing/transporting mechanism 1 can shuttle during the testing.

The unloader handling robot is moved backward (a movement in a direction opposite to a movement in the step (5)) and receives the reversed disk 9 from the disk reversing/transporting mechanism 1 in the position P4. When the surface test of the disk 9 mounted on the spindle 7 is ended, the spindle 9 mounted on the spindle 7 is returned to the initial position P5 (the movement in the step (2)) from beneath the optical system 8 by the spindle switching operation and the unloader handling robot moves forward (the movement in the step (5)). With the movement in the step (2), the tested disk 9 in the initial position P5 is demounted from the spindle 7 and moved to the disk discharging position P6 by the unloader handling robot.

On the other hand, the reversed disk 9 held by the disk reversing/transporting mechanism 1 in the position P4 is received from the disk reversing/transporting mechanism 1 with the forward movement of the unloader handling robot at the time of or after this forward movement (the movement in the step (5)) and is mounted on the spindle 7 in the returned position P5.

FIG. 1 is a perspective view of a mechanism for reversing a disk during transportation of the disk according to an embodiment of this invention.

The disk reversing/transporting mechanism 1 includes a linear moving mechanism 2 which shuttles between the position P3 and the position P4 along the rail 3 provided between the position P3 and the position P4 to transport a disk 9 from the position P3 to the position P4 and returns to the position P3 after the reversed disk 9 is transported to the unloader handling robot in the position P4.

Figure 4:
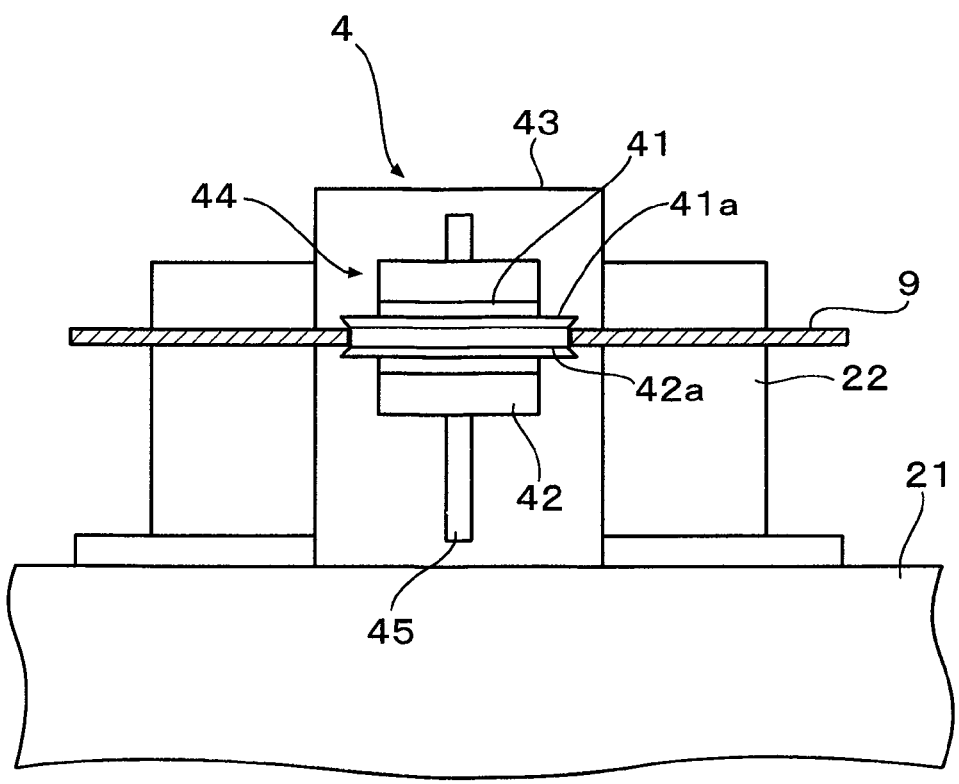
FIG. 4 is a front view of a disk chucking mechanism.

As shown in FIGS. 1 and 4, the disk chucking mechanism 4 includes a hand 44 which is constructed with inner peripheral chucks 41 and 42 and a chuck support 43 for opening/closing the chucks 41 and 42. An opening/closing groove 45 (FIG. 4) for opening/closing the chuck vertically is formed in the chuck support 43 and an opening/closing drive mechanism is provided inside the chuck support 43.

As shown in FIG. 4, chucking disks 41a and 42a are provided in a top portion of each of the chucks 41 and 42.

Incidentally, FIG. 4 is a cross section showing a state of the disk 9 chucked by the disk chucking mechanism 4.

An inner periphery of a central opening of the disk 9 is chucked by the chucking disks 41a and 42a. Each of the chucking disks 41a and 42a has a diameter slightly larger than that of the central opening of the disk 9 and an outer periphery thereof is chamfered.

Returning to FIG. 1, the linear moving mechanism 2 includes a movable table 21 for mounting the disk chucking mechanism 4, a bracket 22 fixed to an upper portion of the movable table 21 and a crank 24 having a crank shaft 23. The movable table 21 and the rail 3 construct a linear motor structure and the movable table 21 is driven such that it moves between the positions P3 and P4.

The crank shaft 23 penetrates the bracket 22 and is rotatably supported thereby. An end portion of the crank arm 24b is fixedly connected to one end of the crank shaft 23 and a roller (cam follower) 24a is provided in the other end portion of the crank arm 24b, so that the roller 24a, the crank arm 24b and the crank shaft 23 construct a crank structure. The other end of the shaft 23 is fixed to a center portion of the chuck support 43.

Incidentally, the chuck support 43 is positioned vertically and the crank arm 24b is supported horizontally by an engagement of the roller 24a with a flat cam surface 5a of the cam 5.

In a case where a pin is used in lieu of the roller, the pin may be fixedly connected to the crank arm 24b.

The cam 5 is a cam plate extending from the position P3 to the position P4 along the rail 3 and has the flat cam surface 5a and a cam groove 5b formed in the flat cam surface 5a. The cam groove 5b is provided in, for example, a center portion between the positions P3 and P4. The roller 24a engages with the flat cam surface 5a, rotates together with the movement of the movable table 21 and slips in the cam groove 5b by its empty load (dead load). The width of the cam groove 5b is larger than a diameter of the roller 24a.

Incidentally, in order to more reliably slip the roller 24a into the cam groove 5b, it is possible to bias the roller vertically downward by such as a spring.

The roller 24a of the crank 24 engages with the cam surface 5a of the cam 5 and rotates along the cam surface 5a with the movement of the movable table 21 of the linear movement mechanism 2 and slips in the cam groove 5b to thereby rotate the crank arm 24b about the shaft 23. When the movable table 21 is moved further, the roller 24a is slipped up from the can groove 5b. The crank arm 24b is rotated by this vertical movement of the roller 24a. In response to this rotation of the crank arm 24b, the shaft 23 is rotated to rotate the chuck support 43. Therefore, the chucked disk 9 is reversed about the shaft 23.

FIGS. 2(a) to 2(g) show this operation for reversing the disk, in which the cam groove 5b is shown in the center portion of the cam plate 5. In order to show the movement of the crank 24, the bracket 22, etc., are omitted.

The chucking of the disk is performed by vertical movements of the chucks 41 and 42. The flowchart, etc., of the drive processing by the control device is not shown.

The disk 9 is chucked by the outer peripheral chuck by the loader handling robot and transported to the position P3. In the position P3, the disk 9 is inserted from the front side of the chucking mechanism 4 (refer to FIG. 4) into between the opened chucks 41 and 42 of the disk chucking mechanism 4 by the loader handling robot (refer to FIG. 2(a)), Next, the lower chuck 42 is lifted up and the disk 9 is received and supported by the loader handling robot (refer to FIG. 2(b)). On the other hand, the loader handling robot releases the chucking of the disk and moves out from the disk chucking mechanism 4. When the loader handling robot moves out from the disk chucking mechanism 4, the lower chuck 42 moves up further and the disk 9 is pinched between the lower chuck 42 and the chuck 41 which is moved down slightly (refer to FIGS. 2(c) and 4). Therefore, the disk 9 is held horizontally in a level higher than the upper surface of the cam plate 5. The vertical movements of the chucks are shown by arrows around the chucks in the respective figures.

The height of the disk 9 held by the chucks 41 and 42 coincides with height of the center of the shaft 23. Since the upward movement of the lower chuck 42 acts as the disk lifting mechanism, any special disk lifting mechanism is unnecessary. Incidentally, the vertical distance of the center of the shaft 23 is larger than a radial length of the disk 9 in view of the reversing of the disk.

Figure 2A:
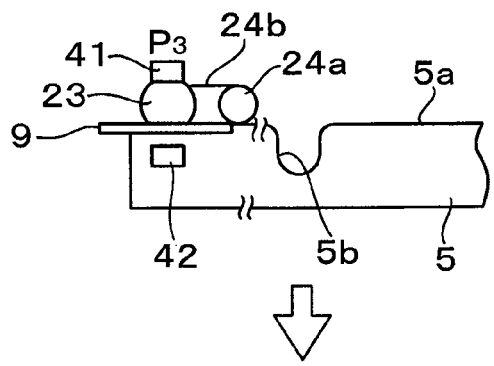
FIG. 2(a) to 2(g) illustrate a disk reversing operation of the disk reversing/transporting mechanism.
Figure 2D:
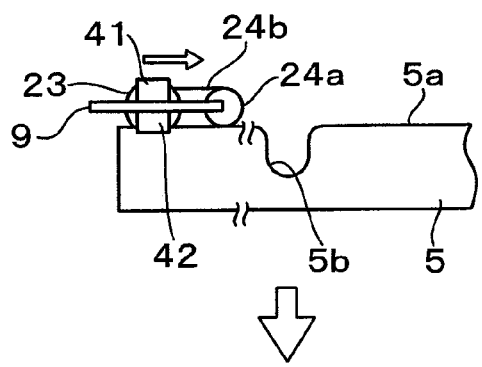
Figure 2B:
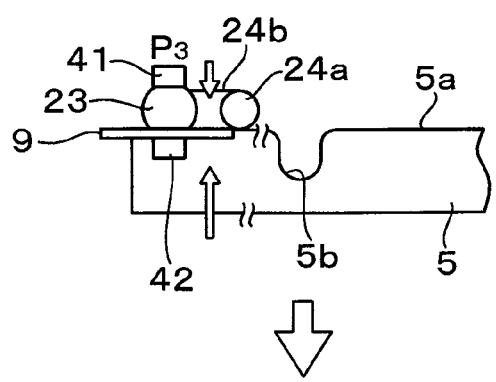
Figure 2E:
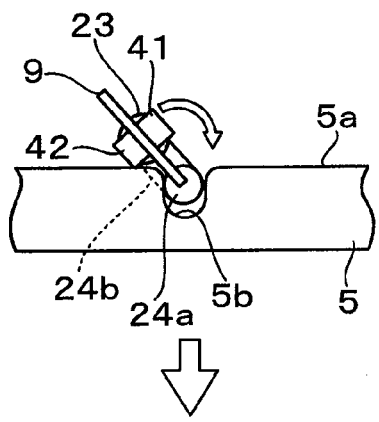
Figure 2C:
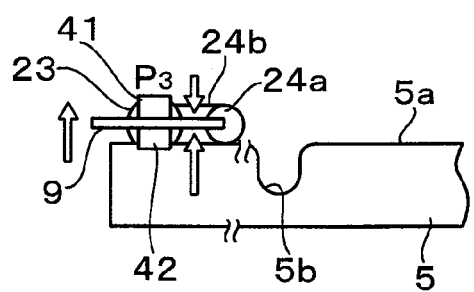
Figure 2F:
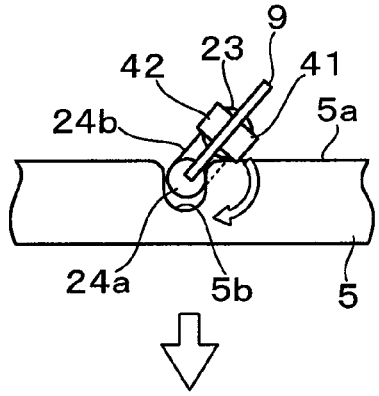

When the movable table 21 of the linear moving mechanism 2 is moved from the position P3 to the position P4, the roller 24a moves along the cam surface 5a of the cam plate 5 (refer to FIG. 2(d)) and, when the movable table 21 comes in the position of the cam groove 5b, the roller 24a slips into the cam groove 5b by the empty load (refer to FIG. 2(e)). Therefore, the shaft 23 starts to rotate and the disk 9 is rotated simultaneously. When the movable table 21 continues the movement toward the position P4, the roller 24a passes through a bottom of the cam groove 5b (refer to FIG. 2(f)) and moves along the cam surface 5a of the cam plate 5 (refer to FIG. 2(g)).

Figure 2G:
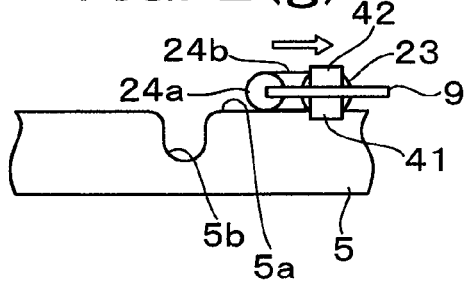

The crank arm 24b is maintained horizontal by the engagement of the roller 24a with a front portion of the cam surface 5a in the moving direction of the movable table 21 as shown in FIG. 2(d) and by the engagement of the roller 24a with a rear portion of the cam surface 5a in the moving direction of the movable table 21 as shown in FIG. 2(g). In FIG. 2(g), the crank arm 24b becomes opposite to that shown in FIG. 2(d) and, in FIGS. 2(d) and 2(g), the roller 24a is rotated by substantially 180° about the center of the shaft 23. As a result, the roller 24a is rotated by about 180° when the movable table 21 passes through the cam groove 5b, so that the disk 9 held by the chucks 41 and 42 horizontally is reversed.

Incidentally, the bottom of the cam groove 5b is the lowest point of the roller 24a or lower. Further, it is possible to rotate the shaft 23 by 180° through gears, etc., by rotating the position of the roller 24a by a predetermined angle smaller than 180°. In such a case, the crank arm 24b may be not horizontal when the disk 9 is held.

When a pin is used in lieu of the roller 24a, the pin slides along the cam surface 5a.

In the moving process shown in FIGS. 2(d) to 2(g), the disk chucking mechanism 4 is rotated clockwise by a half rotation to reverse the disk 9 and the reversed disk is transported from the position P3 to the position P4. When the disk 9 reaches the position P4, the chucked disk 9 is released through the step shown in FIG. 2(c) to the step shown in FIG. 2(a) inversely. The loader handling robot receives the released disk 9 in the position P4 and transports the disk 9 from the position P4 to the position P5. In this case, the disk chucking mechanism 4 is returned from the position P4 to the position P3.

When the movable table 21 returns from the position P4 to the position P3, the roller 24a rotates counterclockwise by 180° through the step shown in FIG. 2(g) to the step shown in FIG. 2(d) and the chucks 41 and 42 return to the initial states in the position P3 as shown in FIG. 2(a).

By the reciprocal movement of the movable table 21, the disk reversing mechanism 1 together with the moving mechanism can repeat the reversing operation of the disk. Further, there is need of neither a drive mechanism for reversing the disk electrically nor a reversing timing control.

As described hereinbefore, the disk 9 in this embodiment is chucked and held horizontally by the chucks 4. However, the reversing of the disk 9 is achieved by rotating the shaft 23 which is rotated by the roller 24a by 180° or a predetermined angle correspondingly to the movement of the movable table 21, without any relation to the chucking angle of the disk 9 by the chucks 4. Therefore, in this invention, it is not always necessary to chuck the disk 9 horizontally by the chuck 4.

Further, since the roller in this embodiment takes the form of the cam follower, the groove to be engaged by the cam follower takes the form of a vertical groove. However, the groove is not limited to the vertical groove and a groove which has a depth enough to rotate the crank arm and is symmetrical about an axis vertical to the moving direction, such as a V groove, may be used.

Incidentally, since it is enough that the roller in the embodiment engages with the groove to rotate the shaft 23 of the chucking mechanism, it may be replaced by a mere pin.

Further, the disk reversing mechanism of the embodiment chucks the inner periphery of the disk. However, it is possible to chuck the outer periphery of the disk unless it competes with the handling robot.

Further, in this embodiment, the disk to be reversed by the disk reversing mechanism is a magnetic disk. However, the present invention can be applied to a circular disk reversing mechanism for a substrate of a magnetic disk and other disks than a magnetic disk.

Further, although the disk reversing/transporting mechanism in a disk tester for sequentially testing opposite surfaces of a disk is described in this embodiment, the disk reversing/transporting mechanism of this invention is not limited to a disk tester.

The invention claimed is:

1. A disk reversing/transporting mechanism for reversing a disk in transit of the disk from a first position to a second position, comprising:
    a rail provided from said first position to said second position;
    a movable table movable on said rail;
    a cam plate having a cam surface provided along said rail and engaged with a roller or a pin and a groove provided on said cam surface and receiving the roller or the pin;
    a chucking mechanism provided on said movable table, for chucking the disk; and
    a crank provided on said moving table, the crank having a crank shaft and said roller or said pin as a crank pin and connected to said chucking mechanism, for rotating said chucking mechanism correspondingly to the rotation of the crank shaft,
    wherein said crank shaft is rotated by a dropping of the roller or the pin in said groove and a slipping out from said groove corresponding to a movement of said movable table to rotate said chucking mechanism to thereby reverse the disk.

2. The disk reversing/transporting mechanism as claimed in claim 1, wherein the roller or the pin is moved vertically when said moving table passes through a position of said groove to rotate said crank shaft about a rotation center by substantially 180°.

3. The disk reversing/transporting mechanism as claimed in claim 2, wherein said cam surface is a horizontal surface, said groove a vertical groove, said roller or said pin drops in said vertical groove by its dead load and said movable table reciprocates between said first position and said second position.

4. The disk reversing/transporting mechanism as claimed in claim 3, wherein said crank pin is a roller, said disk is a magnetic disk or a substrate thereof and said chucking mechanism includes chucks opening/closing vertically and hold said disk horizontally by chucking an inner periphery of said magnetic disk or said substrate thereof.

5. The disk reversing/transporting mechanism as claimed in claim 4, wherein said disk is a magnetic disk, said chuck including a first chuck positioned lower and a second chuck positioned above and said first chuck receives said magnetic disk from a handling robot, lifts it up to a predetermined position and chucks said magnetic disk together with said second chuck.

6. The disk reversing/transporting mechanism as claimed in claim 5, wherein said magnetic disk is held by said first chuck and said second chuck in a level corresponding to a center position of said crank shaft.

7. A disk tester comprising a disk reversing/transporting mechanism claimed in any of claim 1, a first spindle for testing a front surface of a disk and a second spindle for testing a rear surface of the disk, wherein said disk reversing/transporting mechanism transports said tested disk demounted from said first spindle to said second spindle.

8. A disk tester comprising a disk reversing/transporting mechanism claimed in any of claim 2, a first spindle for testing a front surface of a disk and a second spindle for testing a rear surface of the disk, wherein said disk reversing/transporting mechanism transports said tested disk demounted from said first spindle to said second spindle.

* * * * *